US012092450B2

(12) United States Patent
Dai et al.

(10) Patent No.: US 12,092,450 B2
(45) Date of Patent: Sep. 17, 2024

(54) AUTOMATED SELF-CORRECTION OF LOGGING DEPTH BY USING MULTIPLE SENSORS

(71) Applicant: HALLIBURTON ENERGY SERVICES, INC., Houston, TX (US)

(72) Inventors: Bin Dai, Katy, TX (US); Christopher Michael Jones, Katy, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 294 days.

(21) Appl. No.: 17/589,015

(22) Filed: Jan. 31, 2022

(65) Prior Publication Data

US 2023/0243634 A1 Aug. 3, 2023

(51) Int. Cl.
G01B 5/18 (2006.01)
G01V 1/46 (2006.01)
G01V 1/50 (2006.01)

(52) U.S. Cl.
CPC ............. *G01B 5/18* (2013.01); *G01V 1/46* (2013.01); *G01V 1/50* (2013.01)

(58) Field of Classification Search
CPC ............. G01B 5/18; G01V 1/46; G01V 1/50
See application file for complete search history.

(56) References Cited

U.S. PATENT DOCUMENTS

| 5,062,048 A | 10/1991 | Coulter et al. | |
|---|---|---|---|
| 2006/0202700 A1* | 9/2006 | Barolak | E21B 47/085 324/345 |
| 2008/0247268 A1 | 10/2008 | Goodman | |
| 2018/0003032 A1* | 1/2018 | Donzier | G01V 3/26 |
| 2018/0045850 A1 | 2/2018 | Smidth et al. | |
| 2019/0345816 A1* | 11/2019 | Auchere | E21B 44/02 |
| 2019/0353630 A1 | 11/2019 | Vepsalainen et al. | |
| 2021/0010879 A1* | 1/2021 | Vos | G01L 5/0042 |

FOREIGN PATENT DOCUMENTS

| CA | 2815877 A1 * | 7/2012 | ....... E21B 47/02216 |
|---|---|---|---|
| EP | 2317071 A1 | 5/2011 | |
| WO | 2010088681 A2 | 8/2010 | |
| WO | 2013122786 A1 | 8/2013 | |
| WO | WO-2020251522 A1 * | 12/2020 | |

OTHER PUBLICATIONS

Bolt, Harald; "Wireline Logging Depth Quality Improvement: Methodology Review and Elastic-Stretch Correction"; PetroPhysics, vol. 57, No. 3 (Jun. 2016); p. 294-310.
International Search Report & Written Opinion; PCT Application No. PCT/US2022/014716; mailed Oct. 18, 2022.

* cited by examiner

*Primary Examiner* — Douglas Kay
(74) *Attorney, Agent, or Firm* — NOVAK DRUCE CARROLL LLP (57) ABSTRACT

The subject disclosure relates to techniques for correcting logging depth of a well bore. A process of the disclosed technology can include receiving a first sensor measurement from a first sensor disposed in a wellbore, receiving a second sensor measurement from a second sensor disposed in the wellbore, wherein the first sensor and the second sensor are disposed on a wireline with a predetermined distance between the first sensor and the second sensor, generating a correlation function based on the first sensor measurement and the second measurement, and determining, based on the correlation function, whether the measurements indicate a perceived distance between the first sensor and the second sensor deviating from the predetermined distance.

20 Claims, 6 Drawing Sheets

AUTOMATED SELF-CORRECTION OF LOGGING DEPTH BY USING MULTIPLE SENSORS

TECHNICAL FIELD

The present technology is related to accurately logging depth and more particularly to automating self-correction of logging depth by using multiple sensors.

BACKGROUND

Depth is one of the most important formation evaluation measurements, but it is also one of the most difficult to define accurately. Depth control, correction, and reconciliation of depth from multiple run/pass, are still some of the key problems faced in formation evaluation. Due to the environment (temperature and pressure) and mechanical stretch, the depth measurement from wireline or logging-while-drilling (LWD) often needs correction.

DETAILED DESCRIPTION

Figure 1A:
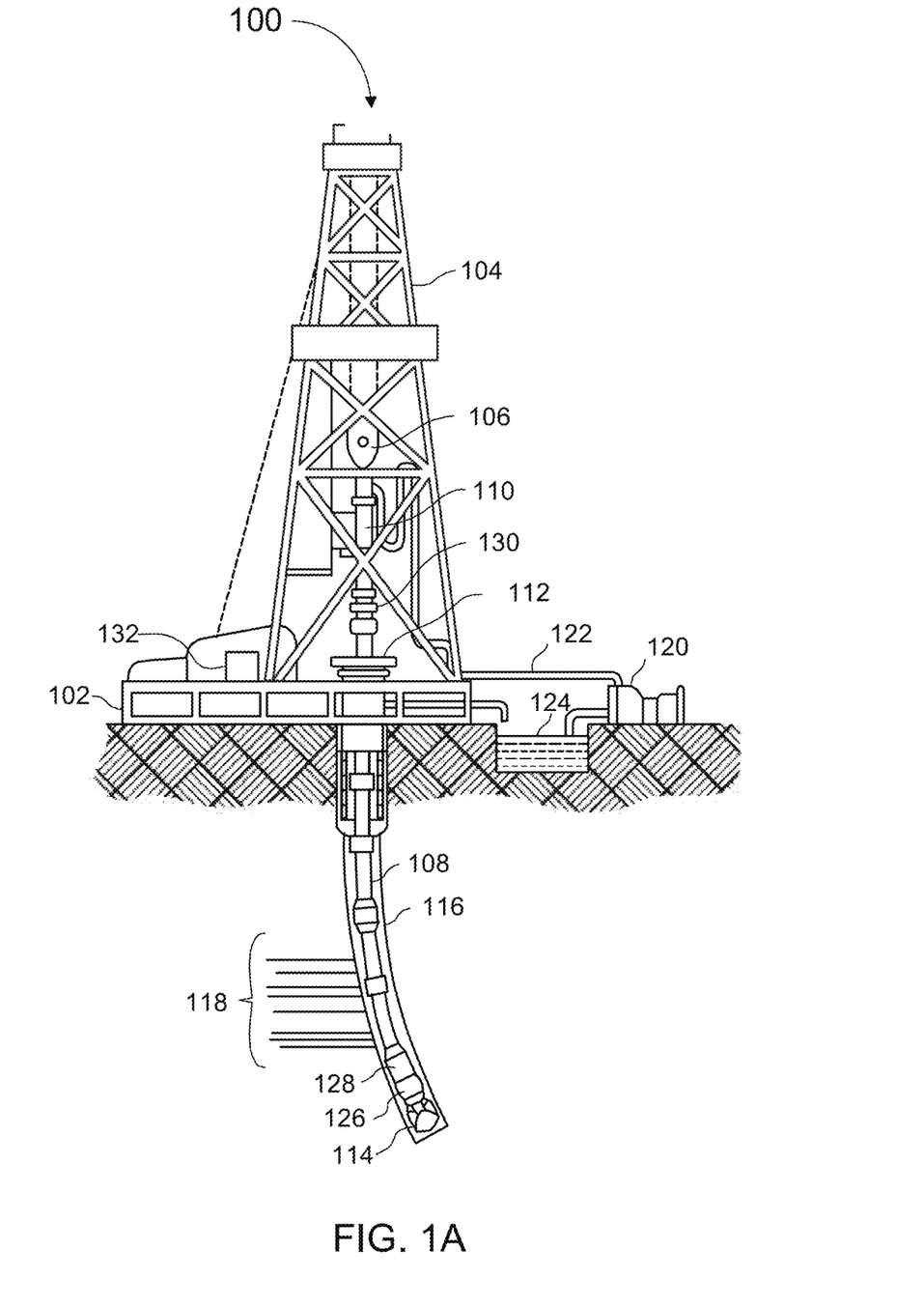
FIG. 1A is a schematic diagram of an example drilling environment, in accordance with various aspects of the subject technology.
Figure 1B:
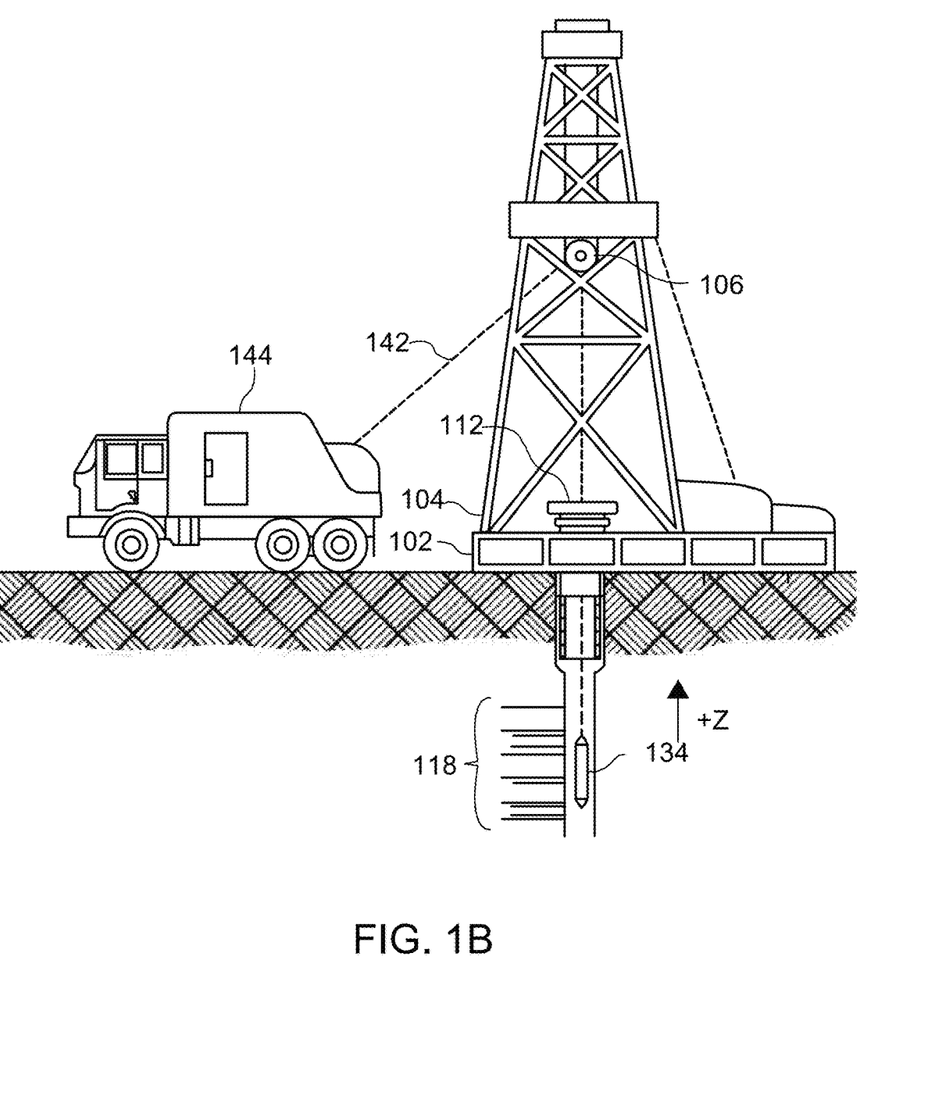
FIG. 1B is a schematic diagram of an example wireline logging environment, in accordance with various aspects of the subject technology.

The disclosure now turns to FIGS. 1A and 1B provide a brief introductory description of the larger systems that can be employed to practice the concepts, methods, and techniques disclosed herein. A more detailed description of the methods and systems for implementing the improved semblance processing techniques of the disclosed technology will then follow.

FIG. 1A shows an illustrative drilling environment 100. Within environment 100, drilling platform 102 supports derrick 104 having traveling block 106 for raising and lowering drill string 108. Kelly 110 supports drill string 108 as it is lowered through rotary table 112. Drill bit 114 is driven by a downhole motor and/or rotation of drill string 108. As bit 114 rotates, it creates a borehole 116 that passes through various formations 118. Pump 120 circulates drilling fluid through a feed pipe 122 to kelly 110, downhole through the interior of drill string 108, through orifices in drill bit 114, back to the surface via the annulus around drill string 108, and into retention pit 124. The drilling fluid transports cuttings from the borehole into pit 124 and aids in maintaining borehole integrity.

Downhole tool 126 can take the form of a drill collar (i.e., a thick-walled tubular that provides weight and rigidity to aid the drilling process) or other arrangements known in the art. Further, downhole tool 126 can include various sensor and/or telemetry devices, including but not limited to: acoustic (e.g., sonic, ultrasonic, etc.) logging tools and/or one or more magnetic directional sensors (e.g., magnetometers, etc.). In this fashion, as bit 114 extends the borehole through formations 118, the bottom-hole assembly (e.g., directional systems, and acoustic logging tools) can collect various types of logging data. For example, acoustic logging tools can include transmitters (e.g., monopole, dipole, quadrupole, etc.) to generate and transmit acoustic signals/waves into the borehole environment. These acoustic signals subsequently propagate in and along the borehole and surrounding formation and create acoustic signal responses or waveforms, which are received/recorded by evenly spaced receivers. These receivers may be arranged in an array and may be evenly spaced apart to facilitate capturing and processing acoustic response signals at specific intervals. The acoustic response signals are further analyzed to determine borehole and adjacent formation properties and/or characteristics.

For purposes of communication, a downhole telemetry sub 128 can be included in the bottom-hole assembly to transfer measurement data to surface receiver 130 and to receive commands from the surface. In some implementations, mud pulse telemetry may be used for transferring tool measurements to surface receivers and receiving commands from the surface; however, other telemetry techniques can also be used, without departing from the scope of the disclosed technology. In some embodiments, telemetry sub 128 can store logging data for later retrieval at the surface when the logging assembly is recovered. These logging and telemetry assemblies consume power, which must often be routed through the directional sensor section of the drill string, thereby producing stray EM fields which interfere with the magnetic sensors.

At the surface, surface receiver 130 can receive the uplink signal from downhole telemetry sub 128 and can communicate the signal to data acquisition module 132. Module 132 can include one or more processors, storage mediums, input devices, output devices, software, and the like as described in further detail below. Module 132 can collect, store, and/or process the data received from tool 126 as described herein.

At various times during the drilling process, drill string 108 may be removed from the borehole as shown in example environment 101, illustrated in FIG. 1B. Once drill string 108 has been removed, logging operations can be conducted using a downhole tool 134 (i.e., a sensing instrument tool) suspended by a conveyance 142. In one or more embodiments, the conveyance 142 can be a cable having conductors for transporting power to the tool and telemetry from the tool to the surface. Downhole tool 134 may have pads and/or centralizing springs to maintain the tool near the central axis of the borehole or to bias the tool towards the borehole wall as the tool is moved downhole or uphole.

Downhole tool 134 can include various directional and/or acoustic logging instruments that collect data within borehole 116. A logging facility 144 includes a computer system, such as those described with reference to FIG. 5, discussed below. In one or more embodiments, the conveyance 142 of downhole tool 134 can be at least one of wires, conductive or non-conductive cable (e.g., slickline, etc.), as well as tubular conveyances, such as coiled tubing, pipe string, or downhole tractor. Downhole tool 134 can have a local power supply, such as batteries, downhole generator and the like.

When employing non-conductive cable, coiled tubing, pipe string, or downhole tractor, communication can be supported using, for example, wireless protocols (e.g. EM, acoustic, etc.), and/or measurements and logging data may be stored in local memory for subsequent retrieval.

Although FIGS. 1A and 1B depict specific borehole configurations, it is understood that the present disclosure is equally well suited for use in wellbores having other orientations including vertical wellbores, horizontal wellbores, slanted wellbores, multilateral wellbores and the like. While FIGS. 1A and 1B depict an onshore operation, it should also be understood that the present disclosure is equally well suited for use in offshore operations. Moreover, the present disclosure is not limited to the environments depicted in FIGS. 1A and 1B, and can also be used in either logging-while-drilling (LWD) or measurement while drilling (MWD) operations.

Figure 2:
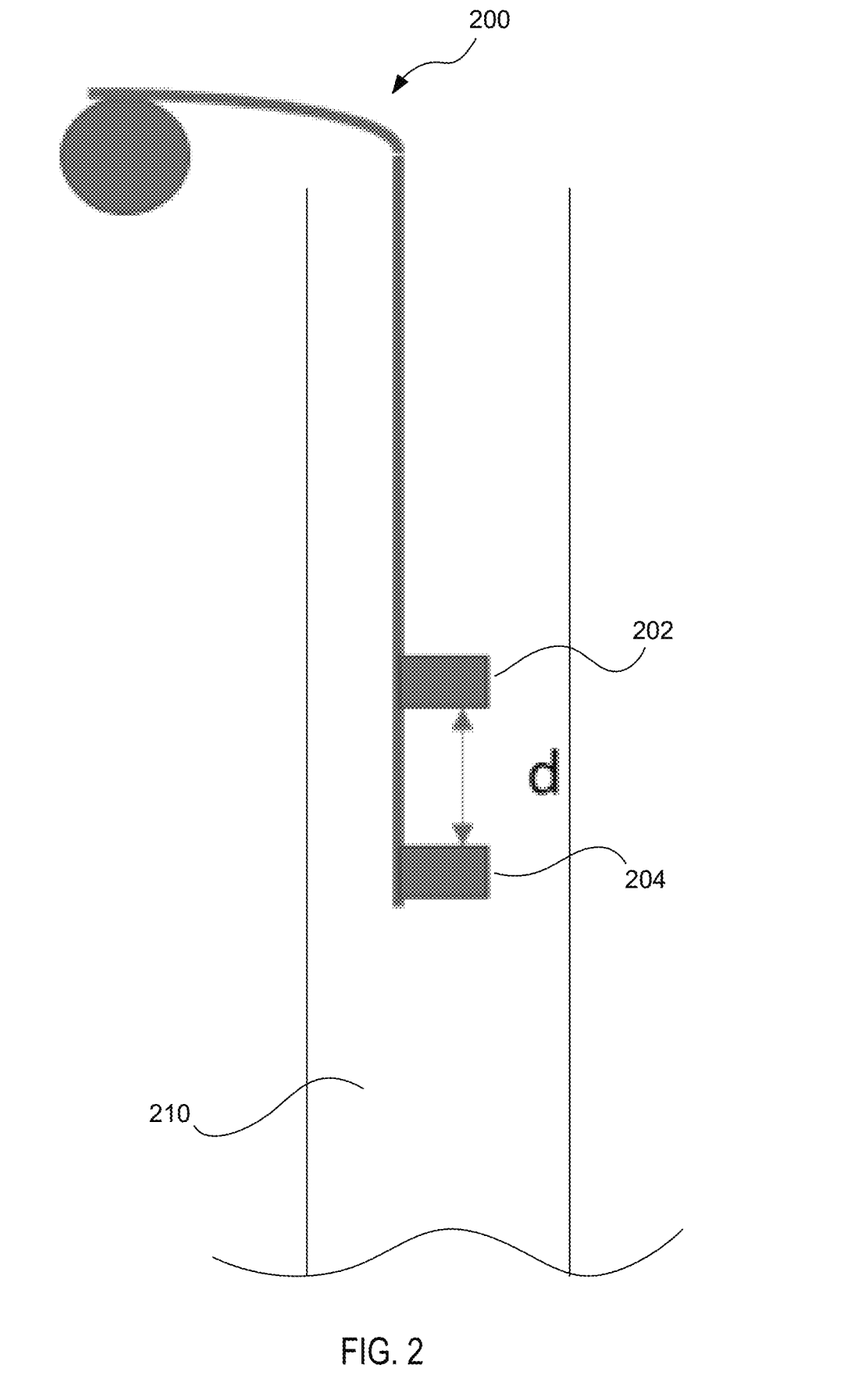
FIG. 2 is an example wireline tool, in accordance with various aspects of the subject technology.

FIG. 2 illustrates an example wireline tool 200 in a wellbore 210. Wireline tool 200 can include multiple sensors, such as first sensor 202 and second sensor 204. First sensor 202 and second sensor 204 can be spaced apart at a fixed or predetermined distance d from each other. In some embodiments, the predetermined distance d can also be referred to as a fixed depth shift or nominal depth shift. In some embodiments, a body of wireline tool 200 can be rigid, such that the distances between sensors 202, 204 are fixed. Accordingly, signals observed from one sensor must be repeated by another sensor at a fixed distance when it passes the same formation location. For example, as a wireline is retracted, first sensor 202 may generate a first set of measurements or deflections that generate a first pattern, while second sensor 204 may generate a second set of measurements or deflections that generate a second pattern. Thus, after accounting for a delay, the first pattern and the second pattern should be substantially similar. Differences between the patterns indicate that there is some depth shift that needs to be corrected. In other words, when the patterns deviate even after adjusting for delay, then there is a difference in the perceived distance between first sensor 202 and second sensor 204. For example, if the predetermined distance between first sensor 202 and second sensor 204 is 10 feet and the perceived distance is 15 feet, then it can be determined that the wireline is stretching.

Figure 3A:
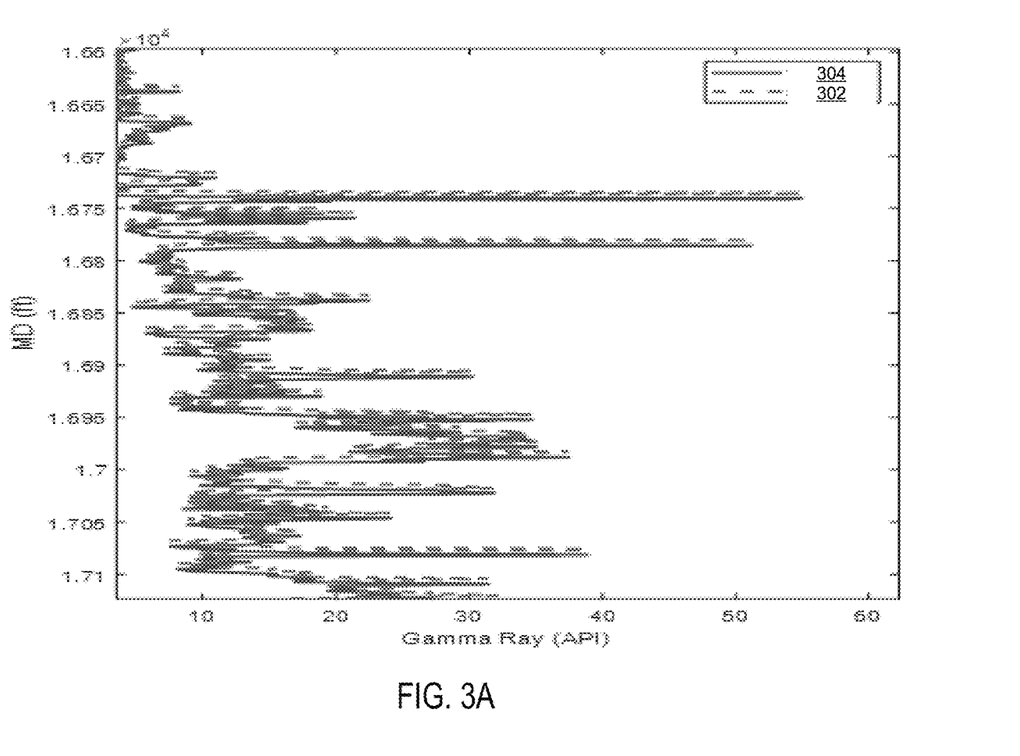
FIG. 3A is an example output of an example cross correlation function, in accordance with various aspects of the subject technology.

FIG. 3A illustrates example outputs of a first sensor (e.g., first sensor 202) and a second sensor (e.g., second sensor 204). More specifically, patterns or logs 302, 304 generated by first sensor 202 and second sensor 204, respectively, can be correlated. An applicable correlation technique can be used to correlate the pattern or logs 302, 304. Specifically, an applicable correlation technique for correlating the patterns or logs in one or more factors related to depth shift can be applied. For example, correlation techniques can include, but are not limited to, cross-correlation methods, key feature matching and/or alignment, dynamic time warping, etc.

As shown, the patterns can be significantly similar with a slight delay in time. The cross-correlation analysis or function is useful for determining the depth shift between two signals. For example, if the depth shift revealed by the cross-correlation function is not the same as the nominal depth shift, a correction needs to be applied to the original depth to account for the cable stretching or slippage or pipe stretching. In some embodiments, a continuous piecewise cross correlation can be conducted for the entire log depth, which will produce continuous depth correction. In other words, when a wireline tool 200 is rigid and the predetermined distance d is fixed, a signal observed by one sensor should be repeated by another sensor at a fixed distance when it passes the same formation location. With this data, the log depth for each pass can be self-corrected, then a standard depth correlation correction can be applied to match two passes, with one as a reference and another one to be matched to the reference pass. It is also contemplated that while peak measurements of sensors may be different, the overarching pattern recorded by the sensors should be the same. Thus, even sensors of different types can be used simply to record patterns rather than specific peaks or values. In other words, the sensors are not limited solely to gamma ray sensors and can include an applicable downhole evaluation sensor including, but not limited to, neutron, nuclear, resistivity, acoustic, imaging, nuclear magnetic resonance (NMR) sensors, etc.

In some embodiments, after calculating the cross-correlation between the two logs, the maximum of the cross-correlation function indicates the point in distance (depth difference) where the signals are best aligned. In other words, the distance delay between the two signals is determined by the argument of the maximum of the cross-correlation. Thus, in some embodiments, the distance delay can be adjusted based on function (1) below:

$$D_{delay} = \mathrm{argmax}((f*g)(d)) \qquad (1)$$

More specifically, the $D_{delay}$ can be calculated continuously by a moving window fashion, for every depth point, there is a $D_{delay}$ associated with it. If $D_{delay}$ is the same as the predetermined distance of two sensors, there is no depth correction needed. If there is a difference, the difference $(d-D_{delay})$ will be applied to the log depth as a correction. The difference can be zero, positive or negative.

It is further considered that if there are more than two sensors, then each additional sensor will generate another log. Thus, there can be additional cross-correlation functions between each pair of sensors, Multiple $D_{delay}$ can be used and averaged to improve accuracy or precision of distance shift.

It is further considered that the data can be preprocessed to improve pattern detection. For example, the data or measurements can be filtered to get rid of noise.

Figure 3B:
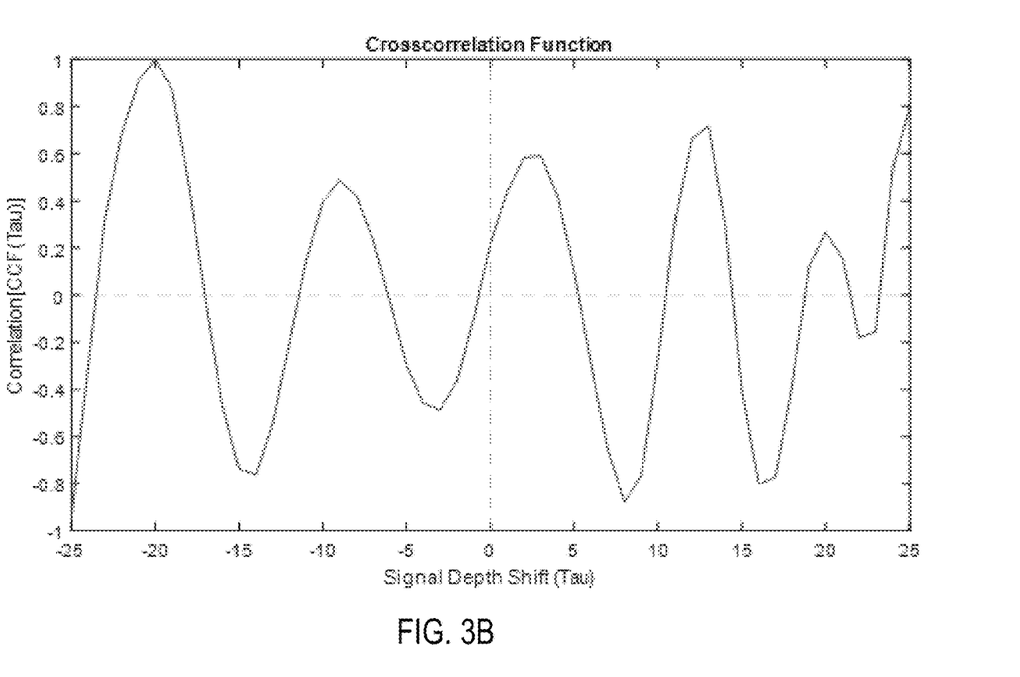
FIG. 3B is an example output of an example cross correlation analysis of patterns or logs generated by a first sensor and a second sensor, in accordance with various aspects of the subject technology.

FIG. 3B illustrates an output of an example cross correlation analysis 300 of patterns or logs 302, 304 generated by first sensor 202 and second sensor 204, respectively (as shown in FIG. 3A). After adjusting for delay, the cross-correlation function can determine correlation between measurements of first sensor 202 and second sensor 204. More specifically, as the adjusted patterns are compared, a higher correlation can be calculated when the peaks of each sensor measurement align. In other words, when the adjusted patterns are aligned, there is a higher correlation of first sensor 202 and second sensor 204. Thus, there is a strong likelihood that the sensors are still spaced apart at the predetermined distance. In other words, the perceived distance between the sensors 202, 204 is substantially similar to the predetermined distance.

Figure 4:
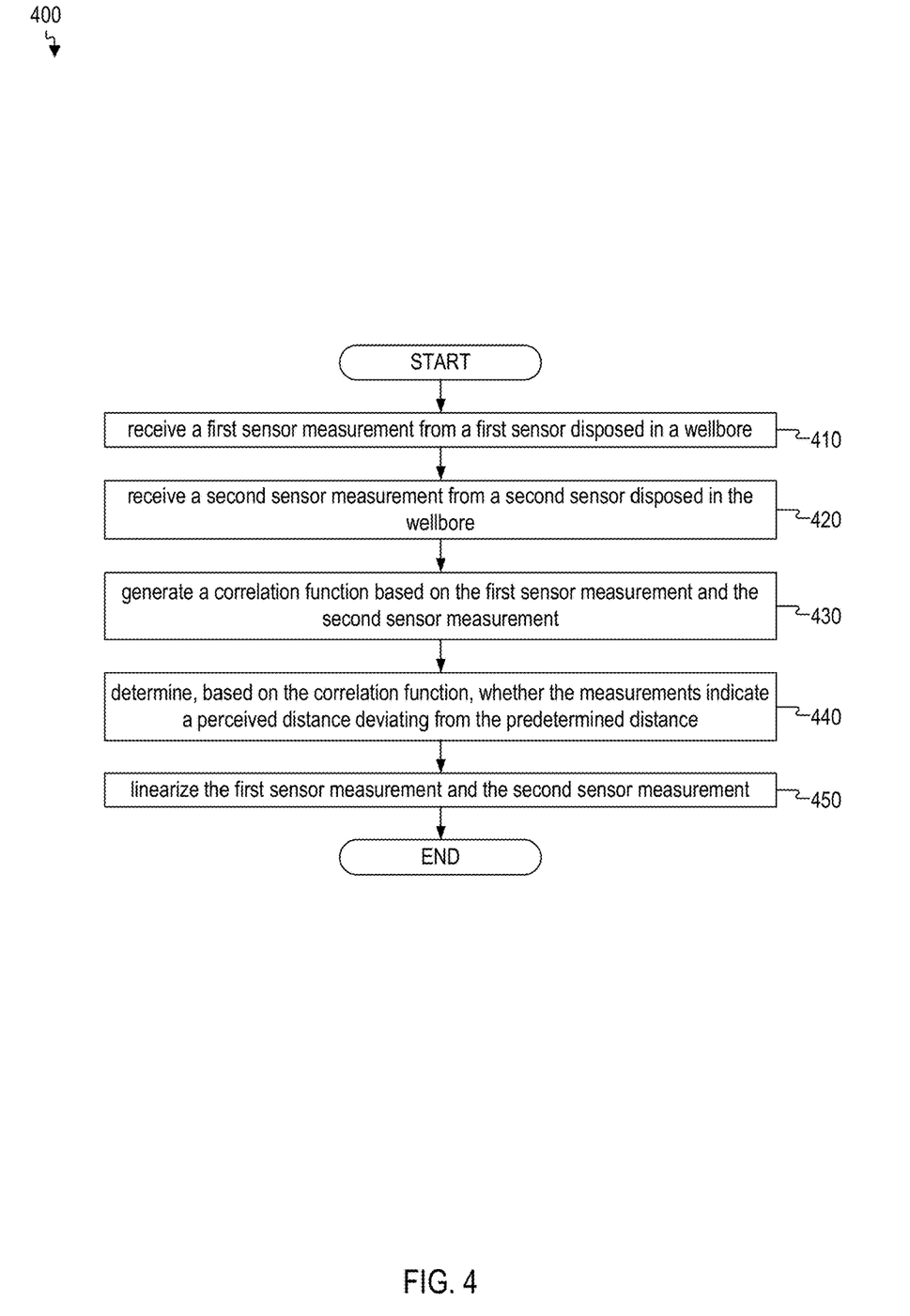
FIG. 4 is a flowchart of a method for self-correcting of logging depth measurements, in accordance with various aspects of the subject technology.

FIG. 4 illustrates an example method 400 for self-correcting of logging depth measurements by utilizing multiple sensors. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method includes receiving a first sensor measurement from a first sensor disposed in a wellbore at step 410. For example, a computer system of logging facility 144 illustrated in FIG. 1B may receive a first sensor measurement from a first sensor disposed in a wellbore. In some embodiments, the set of first sensor data includes a first pattern recorded by the first sensor at a first location. In some embodiments, the first sensor is a gamma ray sensor. In some embodiments, the first sensor measurement is one measurement of a set of first sensor data.

According to some embodiments, the method includes receiving a second sensor measurement from a second sensor disposed in the wellbore at step 420. For example, a computer system of logging facility 144 illustrated in FIG. 1B may receive a second sensor measurement from a second sensor disposed in the wellbore. In some embodiments, the first sensor measurement is obtained at a first point in time and the second measurement is obtained at a second point in time after the first point in time. In some embodiments, the first sensor measurement and the second measurement are obtained at a same location at the first point in time and the second point in time, respectively. In some embodiments, the set of second sensor data includes a second pattern recorded by the second sensor at the first location. In some embodiments, the measurements indicate a deviation from the predetermined distance when the first pattern deviates substantially from the second pattern. In some embodiments, the first sensor and the second sensor are disposed on a wireline with a predetermined distance between the first sensor and the second sensor. In some embodiments, the first sensor measurement and the second sensor measurement are obtained while the wireline is retracted. In some embodiments, the second sensor measurement is one measurement of a set of second sensor data. In some embodiments, the first sensor and the second sensor are different types of sensors.

According to some embodiments, the method includes generating a correlation function based on the first sensor measurement and the second measurement at step 430. For example, a computer system of logging facility 144 illustrated in FIG. 1B may generate a correlation function based on the first sensor measurement and the second measurement. In some embodiments, the correlation function includes an offset in time between the first sensor measurement and the second sensor measurement.

According to some embodiments, the method includes determining, based on the correlation function, whether the measurements indicate a perceived distance between the first sensor and the second sensor deviating from the predetermined distance at step 440. For example, a computer system of logging facility 144 illustrated in FIG. 1B may determine, based on the correlation function, whether the measurements indicate a perceived distance between the first sensor and the second sensor deviating from the predetermined distance. In some embodiments, when the perceived distance is larger than the predetermined distance, the measurements indicate stretching of the wireline. In some embodiments, when the perceived distance is smaller than the predetermined distance, the measurements indicate coiling of the wireline.

According to some embodiments, the method includes linearizing the first sensor measurement and the second measurement based on the correlation function at step 450. For example, a computer system of logging facility 144 illustrated in FIG. 1B may linearize the first sensor measurement and the second sensor measurement based on the correlation function. For example, the log depth for the first sensor measurement and the second sensor measurements can be used to generate a standard depth correlation correction as a reference pass. Additionally, this reference pass can be used to match other future passes. In other words, by linearizing the log depth for the first sensor measurements and the second sensor measurements, the linearized log depths can be used as a baseline for improving otherwise inaccurate or imprecise data.

It is also considered that various other techniques can be performed to enhance and/or augment features of sensor data prior to correlation. For example, polynomial smoothing of the first sensor measurement and the second sensor measurement can be performed to reduce noise in the measurements.

Figure 5:
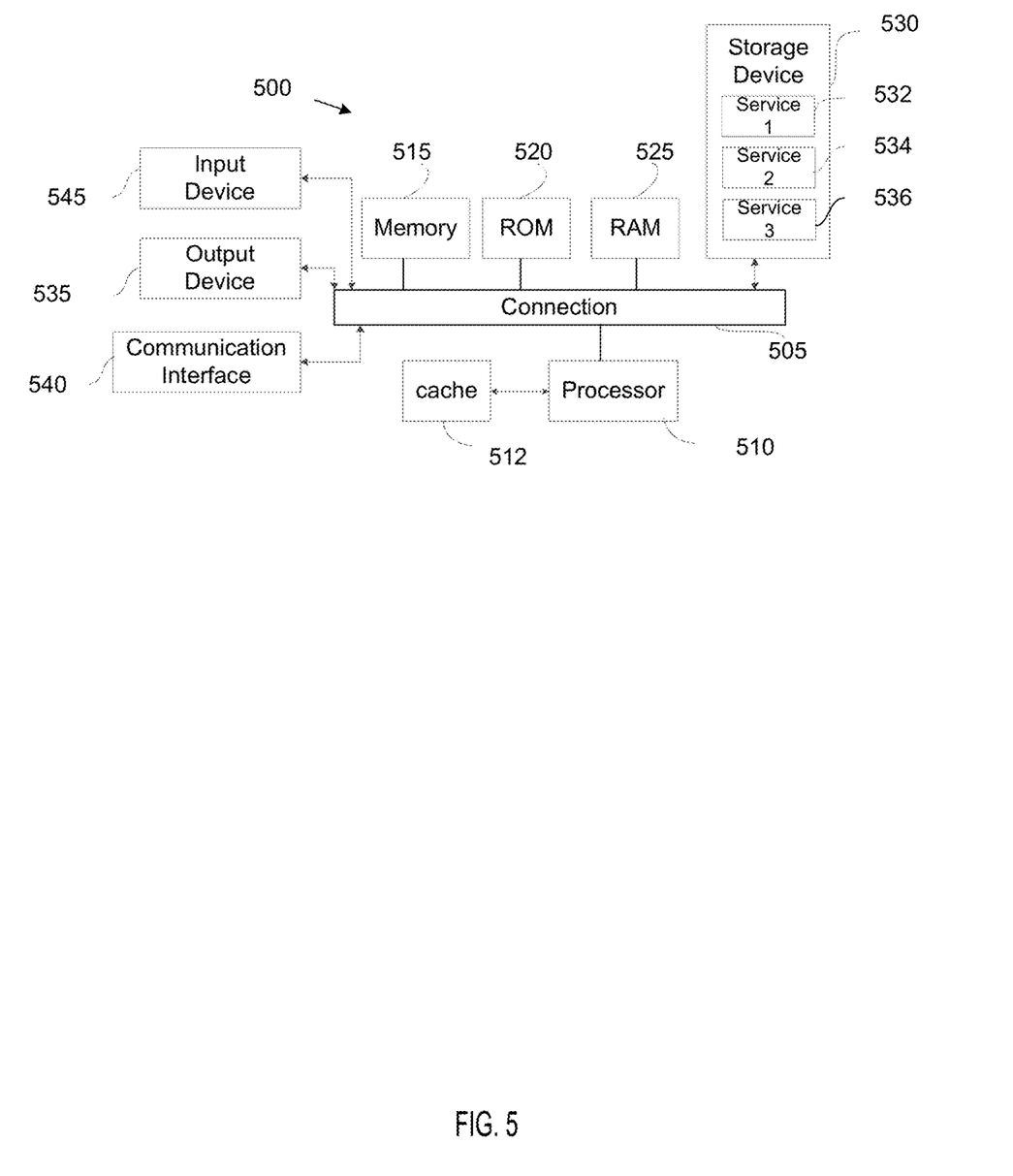
FIG. 5 shows an example of a system for implementing certain aspects of the subject technology.

FIG. 5 shows an example of computing system 500, which can be for example any computing device making up autonomous vehicle 102, local computing device 110, data center 150, client computing device 150, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A computer-implemented method comprising: receiving a first sensor measurement from a first sensor disposed in a wellbore; receiving a second sensor measurement from a second sensor disposed in the wellbore, wherein the first sensor and the second sensor are disposed on a wireline with a predetermined distance between the first sensor and the second sensor; generating a correlation function based on the first sensor measurement and the second measurement; and determining, based on the correlation function, whether the measurements indicate a perceived distance between the first sensor and the second sensor deviating from the predetermined distance.

Aspect 2: The computer-implemented method of Aspect 1, further comprising: linearizing the first sensor measurement and the second measurement based on the correlation function.

Aspect 3: The computer-implemented method of any of Aspects 1 to 2, wherein the first sensor measurement and the second sensor measurement are obtained while the wireline is retracted, and wherein the first sensor measurement is obtained at a first point in time and the second measurement is obtained at a second point in time after the first point in time, and wherein the first sensor measurement and the second measurement are obtained at a same location at the first point in time and the second point in time, respectively.

Aspect 4: The computer-implemented method of any of Aspects 1 to 3, wherein when the perceived distance is larger than the predetermined distance, the measurements indicate stretching of the wireline, and wherein when the perceived distance is smaller than the predetermined distance, the measurements indicate coiling of the wireline.

Aspect 5: The computer-implemented method of any of Aspects 1 to 4, wherein the first sensor is a gamma ray sensor.

Aspect 6: The computer-implemented method of any of Aspects 1 to 5, wherein the first sensor measurement is one measurement of a set of first sensor data, wherein the set of first sensor data includes a first pattern recorded by the first sensor at a first location.

Aspect 7: The computer-implemented method of any of Aspects 1 to 6, wherein the second sensor measurement is one measurement of a set of second sensor data, wherein the set of second sensor data includes a second pattern recorded by the second sensor at the first location.

Aspect 8: The computer-implemented method of any of Aspects 1 to 7, wherein the measurements indicate a deviation from the predetermined distance when the first pattern deviates substantially from the second pattern.

Aspect 9: The computer-implemented method of any of Aspects 1 to 8, wherein the correlation function includes an offset in time between the first sensor measurement and the second sensor measurement.

Aspect 10: The computer-implemented method of any of Aspects 1 to 9, wherein the first sensor and the second sensor are different types of sensors.

Aspect 11: The computer-implemented method of any of Aspects 1 to 9, wherein the first sensor and the second sensor are a same type of sensors.

Aspect 12: A system comprising: a storage configured to store instructions; a processor configured to execute the instructions and cause the processor to: receive a first sensor measurement from a first sensor disposed in a wellbore, receive a second sensor measurement from a second sensor disposed in the wellbore, wherein the first sensor and the second sensor are disposed on a wireline with a predetermined distance between the first sensor and the second sensor, generate a correlation function based on the first sensor measurement and the second measurement, and determine, based on the correlation function, whether the measurements indicate a perceived distance between the first sensor and the second sensor deviating from the predetermined distance.

Aspect 13: The system of Aspect 12, wherein the processor is configured to execute the instructions and cause the processor to: linearize the first sensor measurement and the second measurement based on the correlation function.

Aspect 14: The system of any of Aspects 12 to 13, wherein, the first sensor measurement and the second sensor measurement are obtained while the wireline is retracted, and, the first sensor measurement is obtained at a first point in time and the second measurement is obtained at a second point in time after the first point in time, and the first sensor measurement and the second measurement are obtained at a same location at the first point in time and the second point in time, respectively.

Aspect 15: The system of any of Aspects 12 to 14, wherein when the perceived distance is larger than the predetermined distance, the measurements indicate stretching of the wireline, and when the perceived distance is larger than the predetermined distance, the measurements indicate stretching of the wireline, and.

Aspect 16: The system of any of Aspects 12 to 15, wherein the first sensor is a gamma ray sensor.

Aspect 17: The system of any of Aspects 12 to 16, wherein the first sensor measurement is one measurement of a set of first sensor data and the first sensor measurement is one measurement of a set of first sensor data.

Aspect 18: The system of any of Aspects 12 to 17, wherein the second sensor measurement is one measurement of a set of second sensor data and the second sensor measurement is one measurement of a set of second sensor data.

Aspect 19: The system of any of Aspects 12 to 18, wherein the measurements indicate a deviation from the predetermined distance when the first pattern deviates substantially from the second pattern.

Aspect 20: The system of any of Aspects 12 to 19, wherein the correlation function includes an offset in time between the first sensor measurement and the second sensor measurement.

Aspect 21: The system of any of Aspects 12 to 20, wherein the first sensor and the second sensor are different types of sensors.

Aspect 22: The system of any of Aspects 12 to 20, wherein the first sensor and the second sensor are a same type of sensors.

Aspect 23: A non-transitory computer readable medium comprising instructions, the instructions, when executed by a computing system, cause the computing system to: receive a first sensor measurement from a first sensor disposed in a wellbore; receive a second sensor measurement from a second sensor disposed in the wellbore, wherein the first sensor and the second sensor are disposed on a wireline with a predetermined distance between the first sensor and the second sensor; generate a correlation function based on the first sensor measurement and the second measurement; and determine, based on the correlation function, whether the measurements indicate a perceived distance between the first sensor and the second sensor deviating from the predetermined distance.

Aspect 24: The computer readable medium of Aspect 23, wherein the computer readable medium further comprises instructions that, when executed by the computing system, cause the computing system to: linearize the first sensor measurement and the second measurement based on the correlation function.

Aspect 25: The computer readable medium of any of Aspects 23 to 24, wherein the first sensor measurement and the second sensor measurement are obtained while the wireline is retracted, and, the first sensor measurement is obtained at a first point in time and the second measurement is obtained at a second point in time after the first point in time, and the first sensor measurement and the second measurement are obtained at a same location at the first point in time and the second point in time, respectively.

Aspect 26: The computer readable medium of any of Aspects 23 to 25, wherein when the perceived distance is larger than the predetermined distance, the measurements indicate stretching of the wireline, and when the perceived distance is larger than the predetermined distance, the measurements indicate stretching of the wireline, and.

Aspect 27: The computer readable medium of any of Aspects 23 to 26, wherein the first sensor is a gamma ray sensor.

Aspect 28: The computer readable medium of any of Aspects 23 to 27, wherein the first sensor measurement is one measurement of a set of first sensor data and the first sensor measurement is one measurement of a set of first sensor data.

Aspect 29: The computer readable medium of any of Aspects 23 to 28, wherein the second sensor measurement is one measurement of a set of second sensor data and the second sensor measurement is one measurement of a set of second sensor data.

Aspect 30: The computer readable medium of any of Aspects 23 to 29, wherein the measurements indicate a deviation from the predetermined distance when the first pattern deviates substantially from the second pattern.

Aspect 31: The computer readable medium of any of Aspects 23 to 30, wherein the correlation function includes an offset in time between the first sensor measurement and the second sensor measurement.

Aspect 32: The computer readable medium of any of Aspects 23 to 31, wherein the first sensor and the second sensor are different types of sensors.

Aspect 33: The computer readable medium of any of Aspects 23 to 31, wherein the first sensor and the second sensor are a same type of sensors.

What is claimed is:

1. A computer-implemented method comprising:
while a wireline tool is moving within a wellbore, receiving (i) a first set of sensor data generated by a first sensor of the wireline tool, and (ii);
a second set of sensor data generated by a second sensor of the wireline tool, wherein the first set of sensor data includes a first pattern recorded by the first sensor at a first point in time at a location, the second set of sensor data includes a second pattern recorded by the second sensor at a second point in time at the location, and the first sensor and the second sensor are each disposed on the wireline tool with a predetermined distance between the first sensor and the second sensor;

aligning the first pattern with the second pattern;
generating correlation data indicating a level of correlation between the first pattern and the second pattern based on the aligned first pattern and the second pattern;
determining a perceived distance between the first set of sensor data and the second set of sensor data based at least in part on the correlation data;
determining a deviation between the perceived distance and the predetermined distance; and
correcting an original log depth of the wireline tool based on the deviation.

2. The computer-implemented method of claim 1, further comprising:
linearizing each of the first set of sensor data and the second set of sensor data based on the correlation data.

3. The computer-implemented method of claim 1, wherein the first set of sensor data and the second set of sensor data are each received while the wireline tool is retracting, and wherein the second set of sensor data is received at the second point in time after the first point in time.

4. The computer-implemented method of claim 1, wherein when the perceived distance is larger than the predetermined distance, the deviation indicates stretching of a wireline of the wireline tool, and wherein when the perceived distance is smaller than the predetermined distance, the deviation indicates coiling of the wireline.

5. The computer-implemented method of claim 1, wherein the first sensor is a gamma ray sensor.

6. The computer-implemented method of claim 1, wherein the wireline tool includes a third sensor and the correcting of the original log depth of the wireline tool is further based on a third set of sensor data generated by the third sensor.

7. The computer-implemented method of claim 1, wherein the perceived distance deviates from the predetermined distance when the first pattern deviates substantially from the second pattern.

8. The computer-implemented method of claim 1, wherein the correlation data includes an offset in time between the first set of sensor data and the second set of sensor data.

9. The computer-implemented method of claim 1, wherein the first sensor and the second sensor are different types of sensors.

10. The computer-implemented method of claim 1, wherein the first sensor and the second sensor are a same type of sensors.

11. A system comprising:
a storage configured to store instructions;
a processor configured to execute the instructions and cause the processor to:
while a wireline tool is moving within a wellbore, receive (i) a first set of sensor data generated by a first sensor of the wireline tool, and (ii) a second set of sensor data generated by a second sensor of the wireline tool, wherein the first set of sensor data includes a first pattern recorded by the first sensor at a first point in time at a location, the second set of sensor data includes a second pattern recorded by the second sensor at a second point in time at the location, and the first sensor and the second sensor are each disposed on the wireline tool with a predetermined distance between the first sensor and the second sensor;
align the first pattern with the second pattern;
generate correlation data indicating a level of correlation between the first pattern and the second pattern based on the aligned first pattern and the second pattern;
determine a perceived distance between the first set of sensor data and the second set of sensor data based at least in part on the correlation data;
determine a deviation between the perceived distance and the predetermined distance; and
correct an original log depth of the wireline tool based on the deviation.

12. The system of claim 11, wherein the processor is configured to execute the instructions and cause the processor to:
linearize each of the first set of sensor data and the second set of sensor data based on the correlation data.

13. The system of claim 11, wherein the first set of sensor data and the second set of sensor data are obtained each received while the wireline tool is retracting, and wherein the second set of sensor data is received at the second point in time after the first point in time.

14. The system of claim 11, wherein when the perceived distance is larger than the predetermined distance, the deviation indicates stretching of a wireline of the wireline tool, and when the perceived distance is smaller than the predetermined distance, the deviation indicates coiling of the wireline of the wireline tool.

15. A non-transitory computer readable medium comprising instructions, the instructions, when executed by a computing system, cause the computing system to:
while a wireline tool is moving within a wellbore, receive
(i) a first set of sensor data generated by a first sensor of the wireline tool-disposed in a wellbore,
and (ii) a second set of sensor data generated by a second sensor of the wireline tool, wherein the first set of sensor data includes a first pattern recorded by the first sensor at a first point in time at a location, the second set of sensor data includes a second pattern recorded by the second sensor at a second point in time at the location, and the first sensor and the second sensor are each disposed on the wireline tool with a predetermined distance between the first sensor and the second sensor;
align the first pattern with the second pattern;
generate correlation function data indicating a level of correlation between the first pattern and the second pattern based on the aligned first pattern and the second pattern;
determine a perceived distance between the first set of sensor data and the second set of sensor data based at least in part on the correlation data;
determine a deviation between the perceived distance and the predetermined distance; and
correct an original log depth of the wireline tool based on the deviation.

16. The non-transitory computer readable medium of claim 15, wherein the non-transitory computer readable medium further comprises instructions that, when executed by the computing system, cause the computing system to:
linearize each of the first set of sensor data and the second set of sensor data based on the correlation data.

17. The non-transitory computer readable medium of claim 15, wherein the first set of sensor data and the second set of sensor data are received while the wireline tool is retracting, and wherein the second set of sensor data received at the second point in time after the first point in time.

18. The non-transitory computer readable medium of claim 15, when the perceived distance is larger than the predetermined distance, the deviation indicates stretching of a wireline of the wireline tool, and when the perceived distance is smaller than the predetermined distance, the deviation indicates coiling of the wireline.

19. The non-transitory computer readable medium of claim 15, the first sensor is a gamma ray sensor.

20. The non-transitory computer readable medium of claim 15, wherein the wireline tool includes a third sensor and the correcting of the original log depth of the wireline tool is further based on a third set of sensor data generated by the third sensor.

* * * * *